United States Patent [19]

Rockwell

[11] Patent Number: 4,907,778
[45] Date of Patent: Mar. 13, 1990

[54] COMBINED ACCESSORY CARRIER AND SERVICE STAND FOR A CHAINSAW

[76] Inventor: Martin V. Rockwell, 55 VanKirk Rd., Washington, Pa. 15301

[21] Appl. No.: 276,958

[22] Filed: Nov. 28, 1988

[51] Int. Cl.4 .............................................. F16M 1/00
[52] U.S. Cl. ..................................... 248/676; 83/574; 24/518; 24/327; 224/42.45 R
[58] Field of Search .................. 248/676, 545, 156; 83/574; 294/141; 24/518, 329; 224/42.45 R; 30/297

[56] References Cited

U.S. PATENT DOCUMENTS

| | | |
|---|---|---|
| 1,580,627 | 4/1926 | Peterson . |
| 2,883,184 | 4/1959 | Brewington ..................... 269/104 |
| 3,851,756 | 12/1974 | Brown ............................. 206/216 |
| 4,109,900 | 8/1978 | Vandecoevering ............. 269/102 |
| 4,256,294 | 3/1981 | Hickman et al. ................ 269/16 |
| 4,473,176 | 9/1984 | Harper ....................... 224/424.45 R |
| 4,606,252 | 8/1986 | Lahti ................................ 83/574 |
| 4,657,234 | 4/1987 | Stout ................................ 269/97 |
| 4,757,735 | 7/1988 | Olson ........................... 83/574 X |
| 4,779,503 | 10/1988 | Mitchell ...................... 83/574 X |
| 4,846,385 | 7/1989 | Fratas ....................... 224/424.45 R |

FOREIGN PATENT DOCUMENTS 1011892 4/1952 France .
360328 11/1931 United Kingdom .

Primary Examiner—Blair M. Johnson
Attorney, Agent, or Firm—Buchanan Ingersoll

[57] ABSTRACT

A combined accessory carrier and service stand for a chainsaw is provided. In the accessory carrier configuration, the box-like body is utilized to receive chainsaw accessories, spare parts, tools, fuel and oil for the chainsaw. These items may then be conveniently carried into the field in the combined accessory carrier and service stand. Once in the field, the combined accessory carrier and service stand may readily be converted into the service stand configuration where it supports the chainsaw power head and clamps the cutting chain and chain bar of the chainsaw in either a vertical position or a horizontal position, depending upon the type of service that the chainsaw requires. The handle utilized in the accessory carrier configuration doubles as a vertical support pole when in the service stand configuration.

17 Claims, 3 Drawing Sheets

COMBINED ACCESSORY CARRIER AND SERVICE STAND FOR A CHAINSAW

BACKGROUND OF THE INVENTION

1. Field of the Invention

This invention relates to a combined accessory carrier and service stand for a chainsaw that is selectively convertible from an accessory carrier to a service stand and back again. When in the accessory carrier configuration the carrier and service stand may be utilized to carry chainsaw accessories, tools, fuel and oil in a compact carrying arrangement. When in the service stand configuration, the accessory carrier and service stand may be utilized to support a chainsaw and clamp the cutting chain bar in positions to service the chainsaw chain and the power head of the chainsaw.

2. Description of the Prior Art

When a chainsaw is utilized in the field, it is often necessary to service the chainsaw by adjusting the tension of the chain, sharpening the chain, refueling the chainsaw, adding oil to the chainsaw or replacing parts of the chainsaw. Various clamp and vises have been developed to aid in making these field repairs. U.S. Pat. No. 4,109,900 discloses a vise that may be secured to a tree stump to make field repairs on chainsaws. U.S. Pat. No. 4,657,234 discloses a clamp which may be clamped to a tree and which holds a chainsaw for servicing in the field. A major drawback to these devices is the fact that they are additional loose items which must be transported into the field with the chainsaw.

In order to overcome the drawback of transporting loose accessories into the field, the combined accessory carrier and service stand of the present invention serves as a means of carrying the accessories into the field and also provides a support stand for servicing the chainsaw.

Various types of work stands and portable work stands are also well-known. U.S. Pat. Nos. 1,580,627, 3,851,756, 4,256,294, British Patent No. 360,328 and French Patent No. 1,011,892 all show various types of work stands for various special purposes. None of these work stands, however, are particularly adapted for use with a chainsaw to service the chainsaw as described earlier.

The combined accessory carrier and service stand of the present invention is particularly adapted for satisfying the servicing needs in the field for chainsaw users and, at the same time, providing an accessory carrier that keeps the chainsaw accessories, tools, fuel, oil, and spare parts all together in one convenient carrying package.

SUMMARY OF THE INVENTION

In acordance with the present invention there is provided a combined accessory carrier and service stand for a chainsaw that has a cutting chain and chain bar extending from a power head. The accessory carrier and service stand has a box-like body having a bottom, two side walls, a first end wall and a second end wall. An elongated member is selectively securable to the first and second end walls to serve as a handle for the body or is also selectively securable to the body bottom to serve as a vertical support pole for the body. A ground engaging support is provided to support the elongated member when the elongated member is positioned to serve as a support pole of the body. A chainsaw power head support table top is secured by hinges to the body adjacent the first end wall. A clamp is secured by hinges to the body adjacent the second end wall. The clamp has a first fixed clamp member and a second fixed clamp member oriented at 90° to each other and cooperating with a pivoting clamp member. The clamp can selectively clamp the chainsaw bar in either a vertical position against the first fixed clamp member or in a horizontal position against the second fixed clamp member as a chainsaw power head is supported on the support table top.

Further in accordance with the present invention, there is provided a two-way clamp for clamping the chain bar of a chainsaw alternatively in either a vertical position or a horizontal position. The two-way clamp includes a fixed vertical clamp member having first and second end portions, a fixed horizontal clamp member having first and second end portions, and a pivoting clamp member having first and second end portions. The vertical clamp member first end portion and the horizontal clamp member first end portion are rigidly fixed to each other at a connecting intersection so that the vertical clamp member and the horizontal clamp member extend away from each other at 90°. The pivoting clamp member first end portion is pivotally connected to the connecting intersection so that the pivoting clamp member may be selectively pivoted to a position adjacent the vertical clamp member or to a position adjacent the horizontal clamp member. A first latch is formed on the vertical clamp member second end portion and on the pivoting clamp member second end portion and the first latch is operable to latch the pivoting clamp member to the vertical clamp member. A second latch is formed on the horizontal clamp member second end portion and on the pivoting clamp member second end portion and the second latch is operable to latch the pivoting clamp member to the horizontal clamp member.

The combined accessory carrier and service stand of the present invention provides a box-like body for carrying the various accessories, spare parts, tools, fuel, oil, and other materials that may be required when utilizing a chainsaw in the field. The chainsaw operator may then take the packed combined accessory carrier and service stand in one hand and the chainsaw in the other hand and move into the field to where he may begin his operations. At that point, he may unpack the combined accessory carrier and service stand and convert the combined accessory carrier and service stand to its service stand configuration. This conversion is accomplished by taking the handle of the unit and threading it into a receptacle on the body bottom so that it forms a vertical support pole. A ground support having a large spike-like unit is driven into the ground and the vertical support pole is positioned in the ground support to hold the box-like body at a convenient level above the ground. The power head support table top is moved on its hinges until it is on top of the box-like body. The clamp is moved until it extends above the end wall of the body in position to clamp the chainsaw.

The chainsaw is positioned with the power head on the support table top and with the cutting chain and chain bar extending toward the clamp. If it is desired to service the chain as by adjusting the tension, sharpening the chain, replacing links, or the like, the chain bar is clamped in a vertical position in the two-way clamp. If it is desired to service the power head by adding fuel or adding oil, the chain bar may be unclamped from the vertical position and clamped in the horizontal position to provide easier access to the fuel and oil ports.

All the while that the service stand is in place, the chainsaw operator may service the chainsaw at a convenient height above the ground and need not be concerned about small parts or tools being lost in brush or leaves on the ground. When the chainsaw operator has completed his activity in a specified location, the accessory carrier and service stand may be converted to the accessory carrier configuration and moved to a new location with the chainsaw.

Accordingly, the principal object of the present invention is to provide a combined accessory carrier and service stand for a chainsaw which is particularly adapted for carrying chainsaw accessories and for servicing a chainsaw in the field.

Another object of the present invention is to provide a combined accessory carrier and service stand for a chainsaw which may be readily converted from the accessory carrier configuration to the service stand configuration and back again with a minimum of effort.

A further object of the present invention is to provide a two-way clamp which permits the chain bar of a chainsaw to be clamped in either a vertical position or a horizontal position depending upon the type of servicing of the chainsaw that will be required.

These and other objects of the present invention will be more completely disclosed and described in the following specification, the accompanying drawings and the appended claims.

DESCRIPTION OF THE PREFERRED EMBODIMENT

Figure 2:
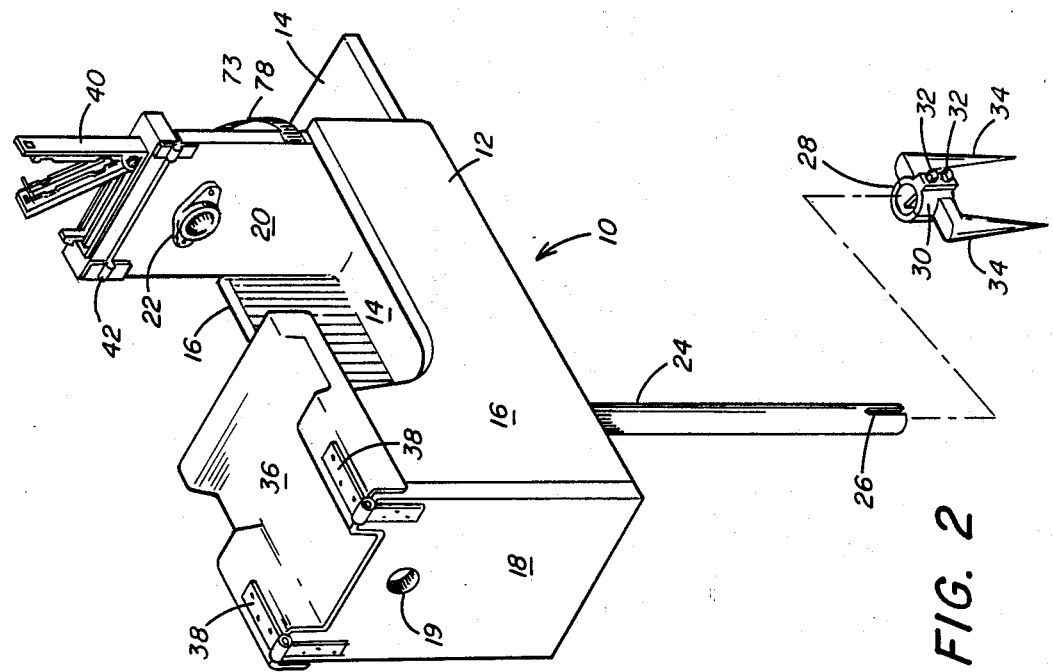
FIG. 2 is a perspective view similar to FIG. 1 showing the combined accessory carrier and service stand in the service stand configuration.
Figure 1:
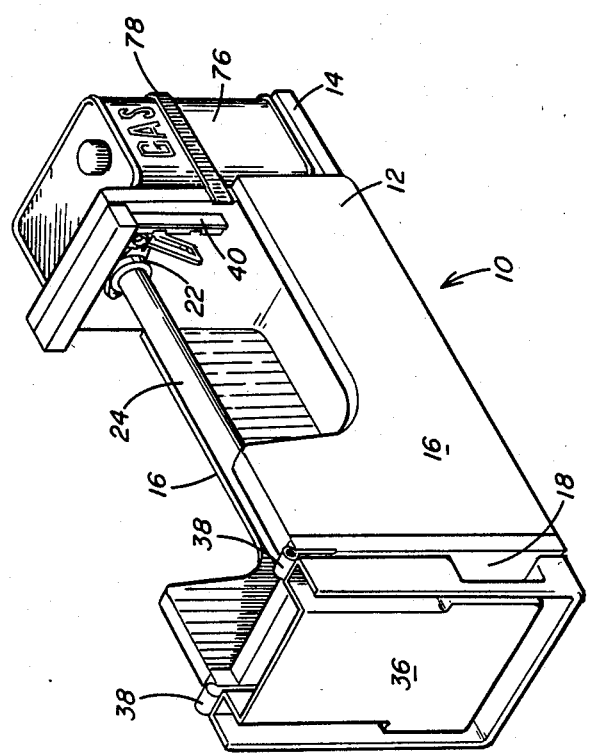
FIG. 1 is a perspective view of the combined accessory carrier and service stand for a chainsaw of the present invention shown in the accessory carrier configuration.

Referring to the drawings and particularly to FIGS. 1 and 2, there is shown a combined accessory carrier and service stand indicated generally at 10. The accessory carrier and service stand has a box-like body 12 that has a bottom 14, two side walls 16, a first end wall 18 and a second end wall 20.

Second end wall 20 has a threaded receptacle 22 fixed to it. A similar threaded receptacle (not shown) is fixed to the outside of the bottom 14 for a purpose to be described. An elongated member 24 serves the dual function of a handle and a support pole for the accessory carrier and service stand 10. The elongated member 24 is preferably formed from a section of cylindrical pipe that is threaded on one end to be received by the receptacle 22 and that has a slot 26 (FIG. 2) formed on the other end.

Figure 4:
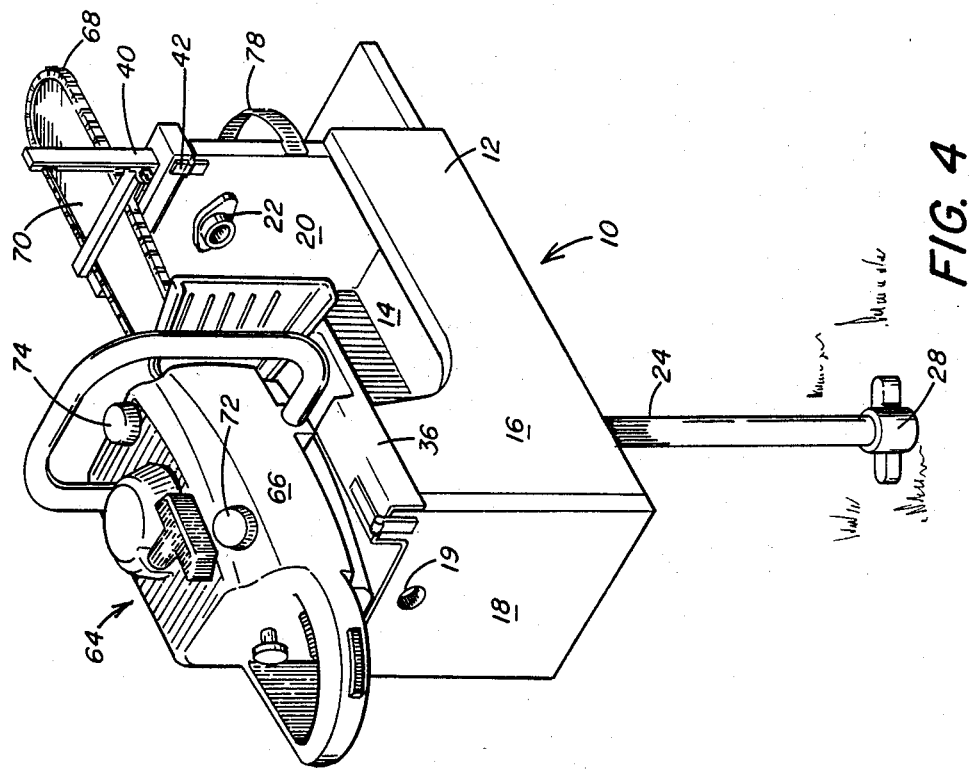
FIG. 4 is a perspective view similar to FIG. 3 showing a chainsaw with the cutter chain and chainbar clamped in a horizontal position on the accessory carrier and service stand of the present invention.
Figure 3:
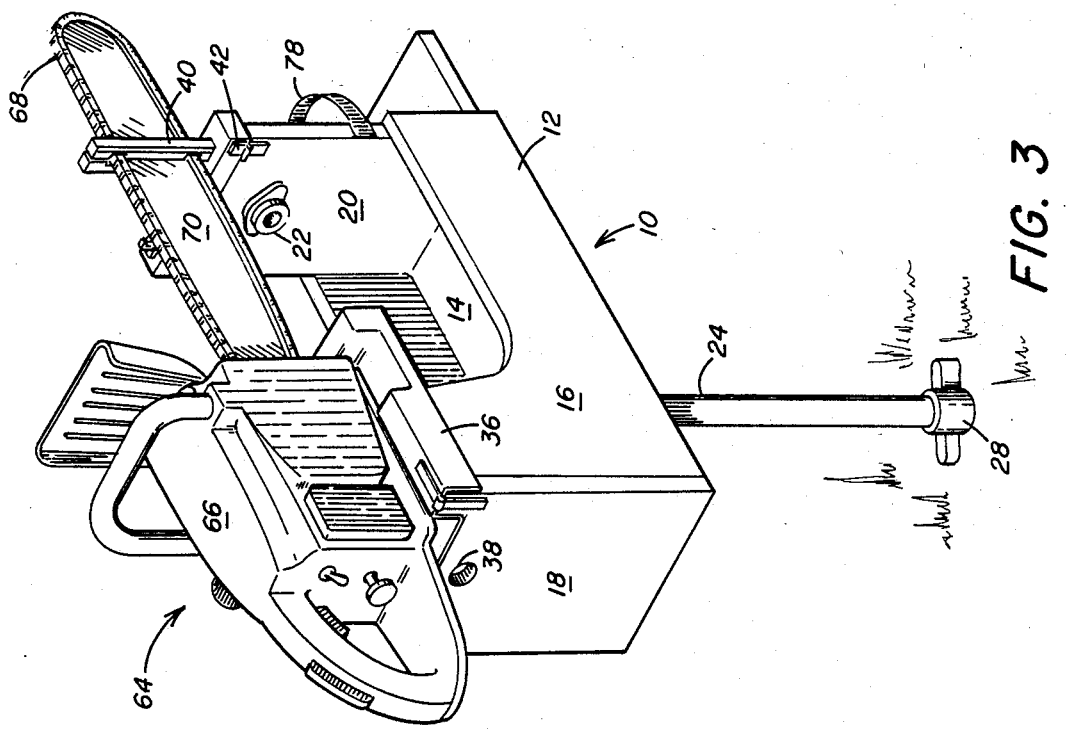
FIG. 3 is a perspective view similar to FIG. 2 showing a chainsaw clamped with the chain and chainbar in a vertical position on the accessory carrier and service stand of the present invention.

A ground engaging support 28 having a tubular body 30 is provided to receive the slotted end of elongated member 24. A pair of diametrically extending pins 32 extend through the tubular body 30 to cooperate with the slot 26 in elongated member 24 to prevent relative rotation of the elongated member 24 when it is positioned within tubular body 30. The ground engaging support 28 also has a pair of spikes 34 formed thereon so that the ground engaging support 28 will solidly engage the ground when the spikes 34 are driven into the ground as shown in FIGS. 3 and 4.

The box-like body 12 also has a chainsaw power head support table top 36 which is preferably formed of a plastic material. The chainsaw power head support table top 36 is contoured to fit over the side walls 16 and to have a ridge at the front portion thereof so that the table top 36 conveniently supports the power head of a chainsaw. The support table top 36 is connected by hinges 38 to the first end wall 18 of the box-like body 12.

Figure 5:
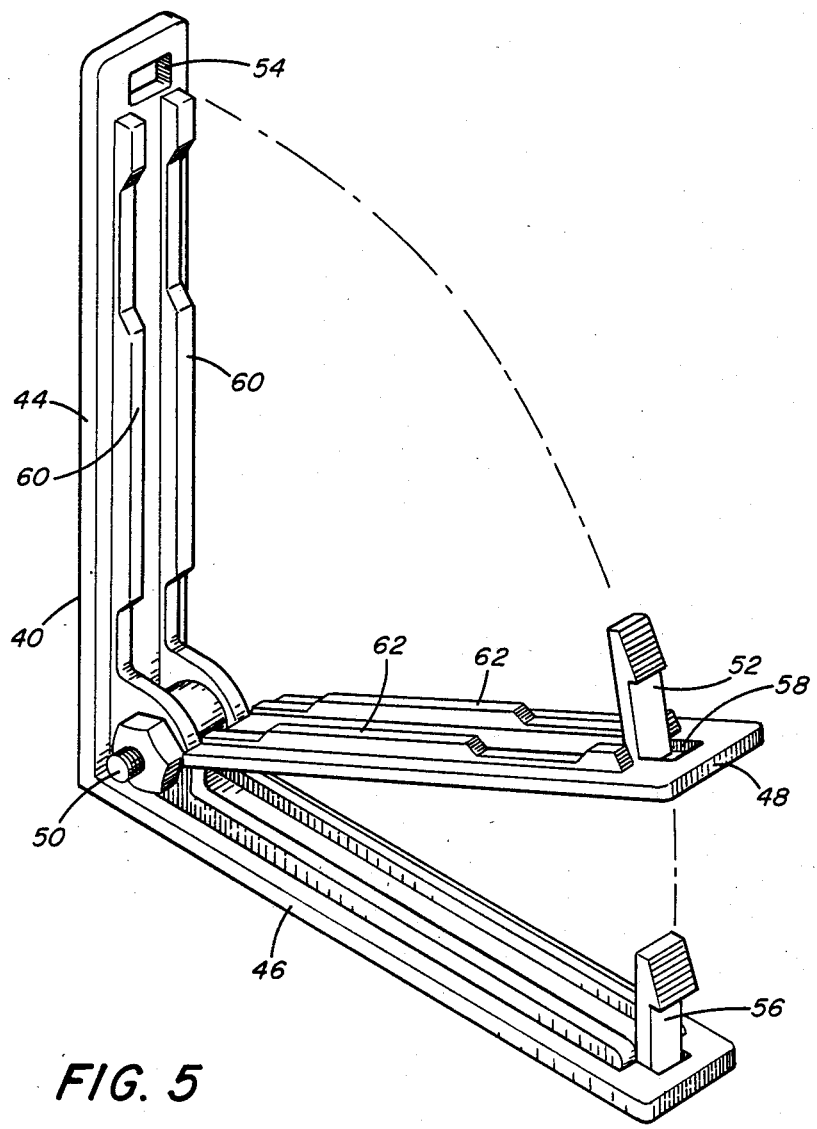
FIG. 5 is a perspective view of the two-way clamp of the present invention.

Atop the second end wall 20 of box-like body 12, a clamp 40 is secured by hinges 42. The clamp 40, as best seen in FIG. 5, has a fixed vertical clamp member 44 and a fixed horizontal clamp member 46 which extend at 90° from an intersection where they meet. A pivoting clamp member 48 is pivotally received upon a bolt 50 at the intersection of fixed vertical clamp member 44 and fixed horizontal clamp member 46. A first latch 52 is fixed to the pivoting clamp member 48 and cooperates with a first latch receptacle 54 formed in the vertical clamp member 44 so that the pivoting clamp member may be latched to the fixed vertical clamp member. A second latch 56 is positioned on the horizontal clamp member 46 and cooperates with a second latch receptacle 58 formed in the pivoting clamp member 48. Latching of the second latch 56 to the second latch receptacle 58 selectively clamps the pivoting clamp member 48 to the fixed horizontal clamp member 46.

The fixed vertical clamp member 44 of clamp 40 has protrusions 60 formed thereon. Similarly, the pivoting clamp member 48 has protrusions 62 formed thereon. In a manner to be described, the protrusions 60 and 62 cooperate to clamp the chain bar of a chainsaw vertically while permitting the chain to move relative to the chain bar.

As seen in FIGS. 3 and 4, the combined accessory carrier and service stand 10 is in the service stand configuration and supports a chainsaw 64. The chainsaw 64 is conventional in all respects and forms no part of the present invention As a typical chainsaw, the chainsaw 64 has a power head 66, a cutting chain 68, a chain bar 70, a gasoline port 72 and an oil port 74.

As seen in FIG. 3, the chainsaw 64 is positioned so that the power head 66 is supported by the support table top 36. The chainsaw is positioned so that the cutting chain 68 and chain bar 70 are in a vertical position. In that position, the pivoting clamp member 48 of the clamp 40 is engaged with the vertical clamp member 44 by means of the first latch 52 and first latch receptacle 54. The protrusions 60 and 62 on the vertical clamp member 44 and the pivoting clamp member 48, respectively, engage the chain bar 70 of the chainsaw 64, but permit the chain 68 to pass freely between the vertical clamp member 44 and the pivoting clamp member 48.

In the vertical position of the chainsaw as shown in FIG. 3, the chain may be serviced by tensioning the chain, sharpening the chain, or otherwise handling repairs to the chain.

Referring to FIG. 4, the chainsaw 64 is shown with the chain bar 70 in a horizontal position clamped between the pivoting clamp member 48 and the horizotal clamp member 46 by means of engagement of the second latch 56 and second latch receptacle 58. In this position of the chainsaw 64, the gasoline port 72 and the oil port 74 are readily accessible for refueling and adding oil to the chainsaw power head 66.

Referring to FIG. 1, it will be seen that in the accessory carrier configuration, the combined accessory carrier and service stand 10 of the present invention has the elongated member 24 threaded into the receptacle 22 on second end wall 20. The elongated member 24 extends through a hole 19 in the first end wall 18 (FIG. 2) so that the elongated member 24 serves as a handle. The chainsaw power head support table top 36 is pivoted about hinges 38 so that it lies outside the box-like body 12 and adjacent to the first end wall 18. The clamp 40 is pivoted about hinges 42 so that it lies within the box-like body 12 and does not extend above the body. A container of gasoline 76 is shown in position outside second end wall 20 while supported on bottom 14 and secured in place by an adjustable lashing strap 78. In the accessory carrier configuration of FIG. 1, the box-like body 12 may be utilized to carry tools, spare parts, oil, and other accessories for a chainsaw. The ground engaging support 28 is also carried within the box-like body 12 in the FIG. 1 configuration.

When it is desired to convert the combined accessory carrier and service stand 10 to the service stand configuration shown in FIGS. 2, 3 and 4, the elongated member 24 is unthreaded from receptacle 22 in end wall 20 and threaded into a similar receptacle (not shown) in the bottom 14. The elongated member then serves as a pole support for the box-like body 12. The ground engaging support 28 is driven into the ground so that spikes 34 are buried as shown in FIGS. 3 and 4. The elongated member 24 is then inserted into the tubular body 30 of ground engaging support 28. The chainsaw power head support table top 36 is then pivoted about hinges 38 to a horizontal position as shown in FIG. 2. The clamp 40 is pivoted about hinges 42 until it is positioned atop the second end wall 20 of the box-like body 12. When the chainsaw 64 is supported on the accessory carrier and service stand 10 the chainsaw 64 is a convenient height from the ground to service the chainsaw and to prevent parts and tools from being mislaid or lost in leaves and brush on the ground.

According to the provisions of the Patent Statutes, I have explained the principle, preferred construction and mode of operation of my invention and have illustrated and described what I now consider to represent its best embodiment. However, it should be understood that, within the scope of the appended claims, the invention may be practiced otherwise than as specifically illustrated and described.

I claim:

1. A combined accessory carrier and service stand for a chainsaw having a cutting chain and chain bar extending from a power head comprising:
   a box-like body having a bottom, two side walls, a first end wall and a second end wall;
   an elongated member selectively securable to said first and second end walls to serve as a handle for said body or selectively securable to said body bottom to serve as a vertical support pole for said body;
   ground engaging means to support said elongated member when said elongated member is positioned to serve as a support pole for said body;
   a chainsaw power head support table top hingedly secured to said body adjacent said first end wall; and
   clamp means hingedly secured to said body adjacent said second end wall, said clamp means having a first fixed clamp member and a second fixed clamp member oriented at 90° to each other and cooperating with a pivoting clamp member to selectively clamp said chainsaw chain bar in either a vertical position against said first fixed clamp member or in a horizontal position against said second fixed clamp member as said chainsaw power head is supported on said support table top.

2. The combined accessory carrier and service stand of claim 1 wherein said elongated member is formed of a section of cylindrical metal pipe having external threads formed on one end.

3. The combined accessory carrier and service stand of claim 2 wherein said body second end wall and said body bottom each have a threaded receptacle fixed thereto to selectively threadingly receive said elongated member.

4. The combined accessory carrier and service stand of claim 1 wherein said ground engaging means has a hollow tubular body and at least one pointed spike attached to said body so that said spike may be driven into the earth.

5. The combined accessory carrier and service stand of claim 1 wherein said body bottom extends beyond said second end wall so that said body bottom may support an accessory on the outside of said box-like body.

6. The combined accessory carrier and service stand of claim 1 wherein said power head support table top is formed from a rigid plastic material and is contoured to support said chainsaw power head.

7. The combined accessory carrier and service stand of claim 1 wherein said power head support table top may be selectively positioned over the top of said box-like body or pivoted about hinges to a position outside said body and adjacent to said body first end wall.

8. The combined accessory carrier and service stand of claim 1 wherein said clamp means may be slectively positioned to an active position on top of said body second end wall or pivoted about hinges to a storage position within said body adjacent to said body second end wall.

9. The combined accessory carrier and service stand of claim 1 wherein said box-like body has sufficient capacity to carry said ground engaging means and other chainsaw accessories, tools, and fuel and oil for said chainsaw.

10. A combined accessory carrier and service stand alternatively having an accessory carrier configuration or a service stand configuration for use with a chainsaw having a cutting chain and chain bar extending from a power head comprising:
    a box-like body having a bottom, two side walls, a first end wall and a second end wall;
    an elongated member selectively securable to said first and second end walls by means of a threaded receptacle attached to one of said end walls and a hole through said other end wall to serve as a handle for said body when said carrier and service stand is in said carrier configuration or selectively securable to said body bottom by means of a threaded receptacle attached to said bottom to serve as a vertical support pole for said body when said carrier and service stand is in said service stand configuration;

a ground engaging support having a pointed member formed to be driven into the ground and a hollow tubular opening to receive said elongated member when said carrier and service stand is in said service stand configuration;

a chainsaw power head support table top hingedly secured to said body adjacent said first end wall whereby said table top is alternatively movable to a horizontal position atop said body in said service stand configuration to bear the weight of said chainsaw power head and to a vertical position abutting said first end wall in said carrier configuration; and clamp means hingedly secured to said body adjacent said second end wall whereby said clamp means is alternatively positionable to an active position atop said second end wall in said service stand configuration and to a storage position within said body in said carrier configuration, said clamp means having a first fixed clamp member extending vertically upwardly in said service stand configuration and a second fixed clamp member extending horizontally at 90° to said first fixed clamp member in said service stand configuration with a pivoting clamp member movable into alternate engagement with said first fixed clamp member or said second fixed clamp member to selectively clamp said chainsaw chain bar in either a vertical position against said first fixed clamp member or in a horizontal position against said second fixed clamp member in said service stand configuration with said chainsaw power head resting on said support table top in either clamped position of said chain bar.

11. The combined accessory carrier and service stand of claim 10 wherein said elongated member is formed of a section of cylindrical metal pipe having external threads formed on one end.

12. The combined accessory carrier and service stand of claim 10 wherein said body bottom extends beyond said second end wall so that said body bottom may support an accessory on the outside of said box-like body.

13. The combined accessory carrier and service stand of claim 10 wherein said power head support table top is formed from a rigid plastic material and is contoured to support said chainsaw power head.

14. The combined accessory carrier and service stand of claim 10 wherein said box-like body has sufficient capacity to carry said ground engaging means and other chain saw accessories, tools, and fuel and oil for said chainsaw.

15. The combined accessory carrier and service stand of claim 10 wherein said elongated member is secured to said second end wall by means of said threaded receptacle attached to said second end wall and said elongated member extends through said hole in said first end wall.

16. The combined accessory carrier and service stand of claim 10 wherein said ground engaging support hollow tubular opening has a pin extending diagonally across said tubular opening and said elongated member has a slotted end portion to receive said pin when said elongated member is inserted into said hollow tubular member.

17. The combined accessory carrier and service stand of claim 10 wherein said clamp means clamps said chain bar in said vertical position without binding said cutting chain so that said cutting chain may be serviced and tensioned while said chain bar is clamped.

* * * * *